July 31, 1962 R. E. SCHWARTZ 3,047,103
FRICTION DEVICE
Filed Nov. 17, 1958 3 Sheets-Sheet 2

INVENTOR:
ROBERT E. SCHWARTZ
By Gravely, Lieder & Woodruff
ATTORNEYS.

July 31, 1962    R. E. SCHWARTZ    3,047,103
FRICTION DEVICE
Filed Nov. 17, 1958    3 Sheets-Sheet 3
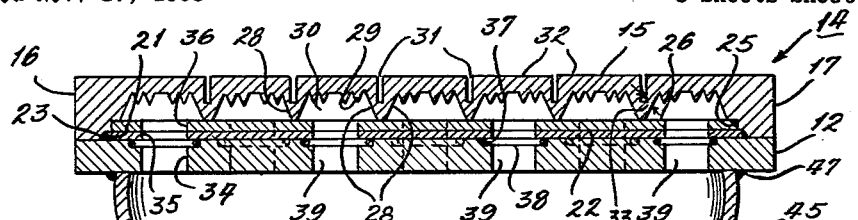
FIG.4
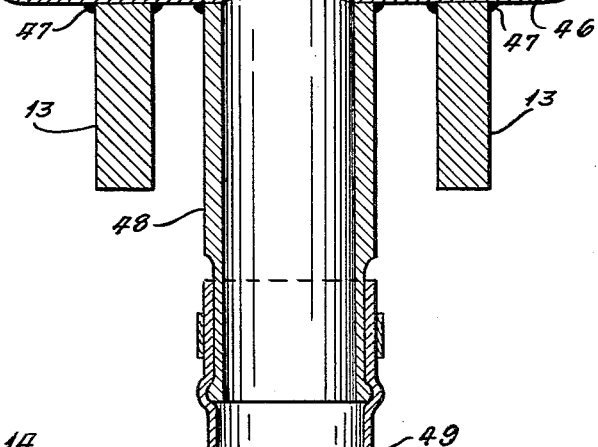
FIG.5
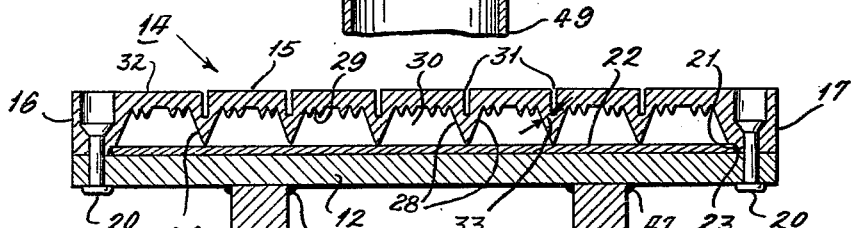
FIG.6
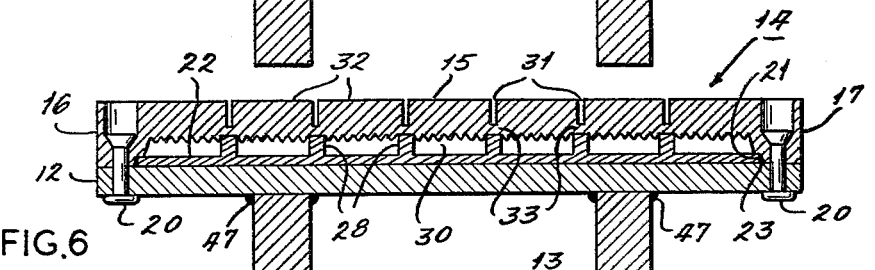
INVENTOR:
ROBERT E. SCHWARTZ
By Gravely, Lieder & Woodruff
ATTORNEYS.

3,047,103
FRICTION DEVICE
Robert E. Schwartz, University City, Mo., assignor to Wagner Electric Corporation, St. Louis, Mo., a corporation of Delaware
Filed Nov. 17, 1958, Ser. No. 774,288
12 Claims. (Cl. 188—264)

This invention relates to friction devices and in particular to a fluid cooled friction member therein.

In the past it has been attempted to cool friction devices by circulating a fluid through a friction member on one side of a metallic friction element so that the intense heat generated during frictional engagement of the friction element with a cooperating friction drum was transferred through the friction element to the cooling fluid. The primary undesirable feature of this type of friction member was that the extreme heat and pressure generated during frictional engagement distorted the metallic friction element so that the friction surface thereof became permanently distorted. The distortion of the metallic friction element caused non-uniform frictional engagement with the cooperating friction drum reducing the effectiveness of the friction device and effecting excessive wear and localized overheating of said metallic friction element. Another undesirable feature was that the permanent distortion of the metallic friction element affected the seals employed in the friction member effecting leakage of cooling fluid therefrom.

An object of the present invention is to provide a fluid cooled friction device which overcomes the above described undesirable features.

Another object of the present invention is to provide a fluid cooled friction member with a relatively thin, metallic, friction element having means to substantially maintain the predetermined symmetry of said friction element during and after intense frictional engagement.

Still another object of the present invention is to provide a fluid cooled friction member with a relatively thin, metallic, friction element having means to absorb deformation thereof due to intense frictional engagement.

These and other objects and advantages of the present invention will become apparent hereinafter.

Figure 1:
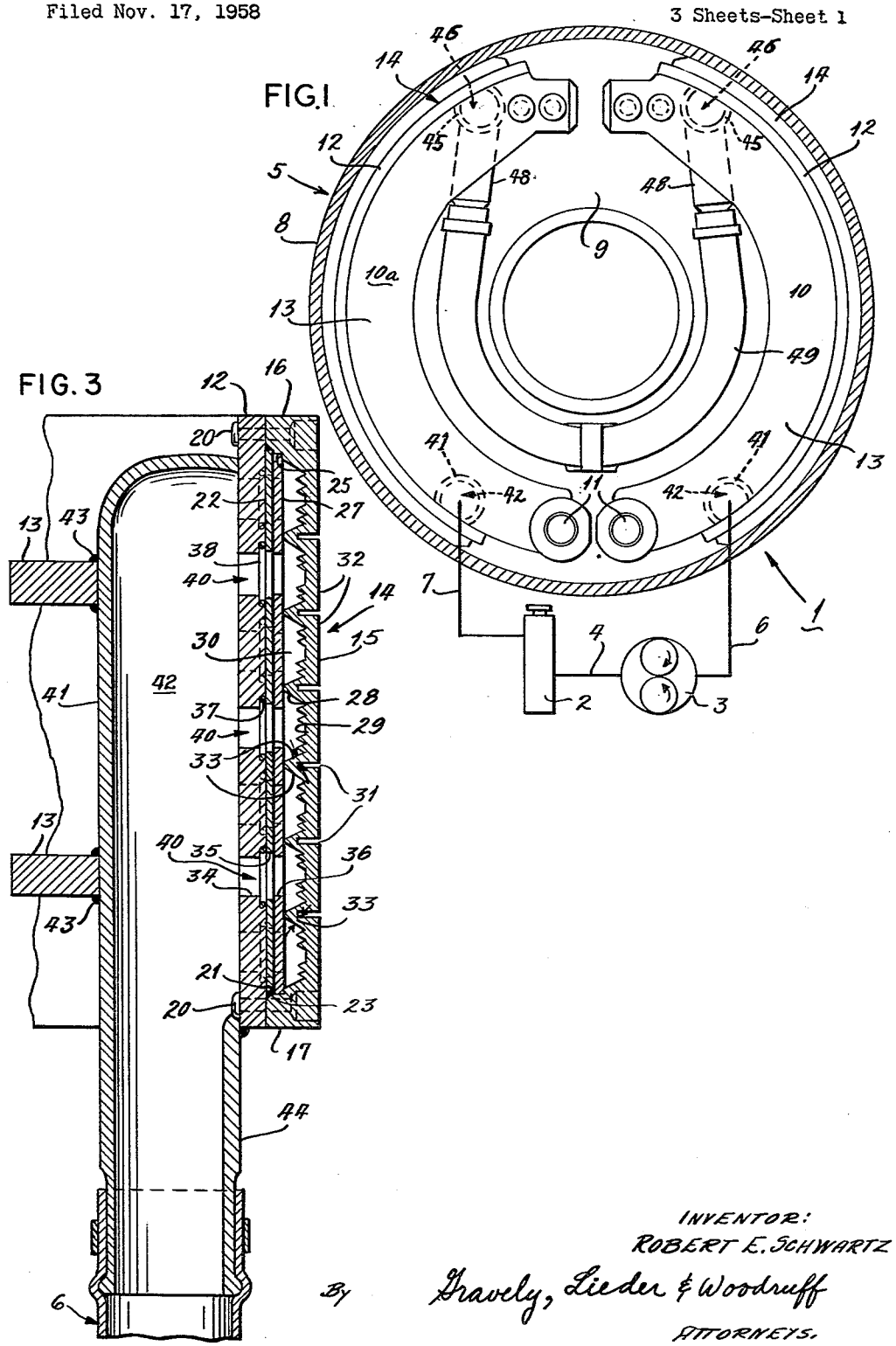
Figure 2:
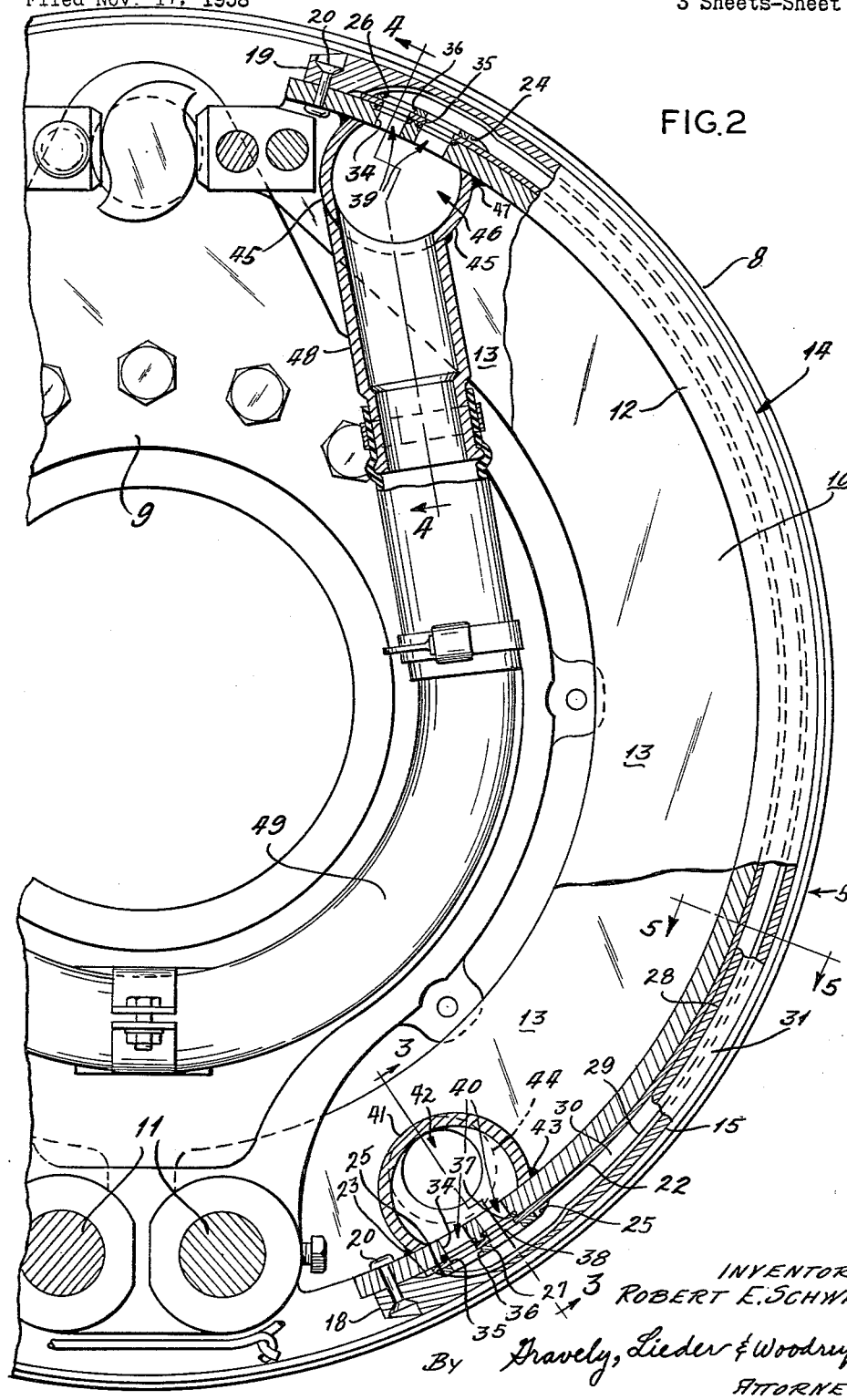

The invention also consists in the parts and in the arrangements and combinations of parts hereinafter described and claimed. In the accompanying drawings which form a part of this specification and wherein like numerals refer to like parts wherever they occur:

FIG. 1 is a diagrammatic view of a brake cooling system showing a fluid cooled friction device embodying the invention, FIG. 2 is a greatly enlarged fragmentary elevational view, partly in section, showing a friction member, FIG. 3 is a cross sectional view taken along line 3—3 of FIG. 2, FIG. 4 is a cross-sectional view taken along line 4—4 of FIG. 2, FIG. 5 is a cross-sectional view taken along line 5—5 of FIG. 2, and FIG. 6 is a cross sectional view of a modified friction member showing supporting means for a metallic friction element integral with a base plate.

Briefly, the invention is embodied in a fluid cooled friction device having a friction member through which cooling fluid is circulated in heat exchange relationship with a metallic friction element attached thereto. The inner surface of the metallic friction member is supported to oppose inward distortion, and the outer surface, or friction surface, thereof is provided with a plurality of groove means for accommodating or absorbing permanent distortion in response to metal growth of the entire metallic friction element.

Referring now to FIG. 1 in detail, a cooling fluid system 1 is provided with a heat exchanger, such as a vehicle radiator 2, which also serves as a reservoir for cooling fluid. A separate reservoir for cooling fluid could be employed in the system 1 in combination with the heat exchanger 2, but for simplicity only said heat exchanger is shown. The heat exchanger 2 is connected with the suction side of pumping means 3 by a conduit 4, said pumping means being driven by the vehicle motor (not shown) or other means, as desired; and, the discharge side of said pumping means is connected to the inlet of a friction device or brake assembly 5 by a conduit 6. To complete the cooling fluid system 1, the outlet of the friction device 5 is connected to the heat exchanger 2 by a return conduit 7. While only one friction device 5 has been described in the system 1 for simplicity, it is to be understood that more than one of said friction devices could be connected in said system, either in series or in parallel, and that said friction devices may be actuated either hydraulically, mechanically, or in any other conventional manner.

The friction device 5 includes a friction drum 8, which is adapted for attachment with a rotatable member, such as a vehicle wheel (not shown), and a shoe supporting member 9, which is adapted for attachment with a non-rotatable member, such as a vehicle axle flange (not shown). The friction device 5 also comprises opposed friction members or brake shoes 10 and 10a which are pivotally anchored at 11 on the non-rotatable or shoe supporting member 6; however, it is to be understood that other conventional means for anchoring said friction members are contemplated. The opposed friction members 10 and 10a are of identical construction and are actuated into frictional engagement with the rotatable friction drum 8 by conventional means (not shown). Since the opposed friction members 10 and 10a are identical, only the friction member 10 is shown in detail in FIGS. 2, 3, 4, and 5 and will be hereinafter fully described.

The friction member 10 is provided with an arcuate platform portion or table 12 reinforced on the inner or concave side thereof by spaced webs 13 forming a carrying or base member for a metallic friction element 14. It is to be understood that the metallic friction element 14 can be readily utilized in disc or other conventional type brake devices by making minor alterations therein which are obvious to those skilled in the art; however, for simplicity, said metallic friction element is described hereinafter in combination with a brake shoe illustrated by the conventional table 12 and webs 13.

The metallic friction element 14 is preferably formed from a metal having high thermal conductive properties, such as electrolytic copper or sterling silver. Certain copper alloys, or other similar alloys, may be employed in the friction element 14, but they should have melting points of at least 1500° F. and thermal conductive properties of at least 40% of that of electrolytic copper. The friction element 14 is substantially C-shaped in cross-section having a relatively thin arcuate wall 15 with integrally formed side walls 16, 17, 18, 19, respectively, extending inwardly therefrom; and said friction element is fixedly attached to the outer or convex surface of the table 12 by a plurality of rivets 20 which extend through said side walls of said friction element.

The side walls 16, 17, 18, 19 are recessed at 21 to receive an arcuate base plate 22 which is sealably brazed or welded thereto as shown at 23. The base plate 22 is preferably formed from the same material as the friction element 14, and the inner or concave surface thereof is normally in contact with the outer or convex surface of the table 12. The side walls 16, 17, 18, and 19 are additionally recessed at 24 and 25, in FIG. 2, to receive upper and lower strengthening plates 26 and 27, which are in fixed surface contact with the upper and lower ends, respectively, of the base plate 22. The inner or concave surface of the arcuate wall 15 is provided with a plurality of integrally formed, spaced, ribs or supporting means 28 which extend into abutment with the base plate 22 and strengthening plates 26 and 27 and extend longitudinally substantially the entire length of said inner surface. Of course, it is apparent that the ribs 28 could be integral with or carried by the base plate 22 and extend into abutment with the inner surface of the arcuate wall 15 as shown in FIG. 6, but the preferred construction provides said ribs integrally formed with the arcuate wall 15, as above described. A plurality of fins 29 are also provided in the inner surface of the arcuate wall 15 between each of the ribs 28 to enhance heat transfer. In this manner, a plurality of flow or circulating chambers 30 are defined between the inner surfaces of the arcuate wall 15 and base plate 22 and each of the plurality of ribs 28.

The outer or convex surface of the arcuate wall 15, which is adapted for frictional engagement with the friction drum 8, is provided with a plurality of spaced longitudinal grooves 31 which extend substantially the entire length of said outer surface. The grooves 31 are formed in the arcuate wall 15 at predetermined positions in alignment with the ribs 28 or some of them, so that each groove 31 is opposite to and extends into the corresponding rib. Accordingly, the width of the arcuate wall 15 is divided into a plurality of smaller longitudinal spans 32 by the grooves 31, and the loci of weak points, shown at 33, of the wall 15 are purposely created by positioning the grooves 31 opposite to the ribs 28 so that the narrowest cross-section of the wall 15 is between the grooves and the ribs. Each of the spans 32 is proportionately stiffer in resisting buckling than the original entire width of said arcuate wall and the weakest areas of the wall 15 are located between the relatively strong spans 32 supported by the ribs 28 so that the force carrying capacity of the friction element 14 is appreciably increased.

Intense heat generated by a frictional engagement sometimes effects growth in a metallic friction element, that is the particular metal will expand beyond the elastic limit thereof effecting plasticity in said metal and a resulting permanent deformation. In other words, due to metal growth, a metallic friction element will not reassume its original shape when heated enough to expand beyond the elastic limit thereof and deform plastically. In the present construction, the major portion of the deformation of the individual spans 32 due to growth from the intense heat generated upon frictional engagement will be absorbed along the loci of weak points 33 and thereby, while the growth or permanent distortion of metal is permitted by the grooves 31, said grooves substantially reduce or oppose the deformation tendency of the entire arcuate wall 15.

When the supporting ribs 28 are integral with or carried by the base plate 22, as previously mentioned and as shown particularly in FIG. 6, said ribs extend into abutment with the inner surface of the arcuate wall 15. The grooves 31 in the outer surface of the arcuate wall 15 are positioned relative to the ribs 28, that is in alignment with said ribs, for strengthening purposes to oppose distortion of said arcuate wall inwardly of the chambers 30. In this embodiment, the narrowest cross-section of the arcuate wall 15 of the friction element 14 is intermediate the spans 32 and between said ribs and the inner surface of said arcuate wall. The major portion of the deformation of the individual spans 32 due to growth from the intense heat generated upon frictional engagement will be absorbed along the loci of weak points 33 whereby the grooves 31 permit said growth or permanent deformation while reducing or opposing the distortion tendencies of the entire arcuate wall 15.

To introduce cooling fluid into the chambers 30, a plurality of aligned apertures 34 and 35 are provided through the table 12 and base plate 22, respectively, adjacent the upper and lower ends thereof, and a plurality of apertures 36 are provided in the upper and lower strengthening plates 26 and 27 in alignment with the apertures 34 and 35. The apertures 34 in the table 12 are recessed at 37 to receive O rings 38 which form seals between said recesses in said table and the base plate 22. Thus, it is apparent that the aligned apertures 34, 35, and 36 form a plurality of upper and lower flow passages 39 and 40 to introduce cooling fluid flow into chambers 30 and to discharge said cooling fluid flow therefrom. A lower plenum housing 41 having a plenum chamber 42 therein extends through the webs 13 of said friction member 10 and is positioned on the inner surface of the table 12 so that said plenum chamber communicates with the flow passages 40, said housing being secured to the table and webs by suitable means, such as a plurality of welds 43. The plenum housing 41 is also provided with a tubular fitting 44 through which cooling fluid flow may be introduced into or discharged from the plenum chamber 42. An upper plenum housing 45 having a plenum chamber 46 therein also extends through the webs 13 and is positioned in the inner surface of the table 12 so that said plenum chamber communicates with the flow passages 39, said housing being fixedly attached to said table and webs by suitable means, such as a plurality of welds 47. The upper plenum housing 45 is also provided with a tubular fitting 48 through which cooling fluid flow may be introduced into or discharged from the plenum chamber 46. In the friction device 5, FIG. 1, the plenum chambers 46 in the upper plenum housings 45 of the friction members 10 and 10a are connected by a flexible hose or conduit 49 which is attached to the tubular fittings 48 thereof. The tubular fittings 44 of the lower plenum housings 41 connect the plenum chambers 42 therein with the conduits 6 and 7, respectively, of the cooling fluid system 1. Thus, the corresponding cooling fluid chambers 30 of the friction members 10 and 10a are connected in series with each other, the opposite plenum chambers of the two friction members functioning respectively as inlet and outlet for the friction device 5.

In the operation, pumping means 3 normally circulates cooling fluid from the heat exchanger 2 via the conduits 4 and 6 into the tubular fitting 44 and lower plenum chamber 42 of the friction member 10. The cooling fluid then flows through the lower flow passages 40, the plurality of circulating chambers 30, and the upper flow passages 39 into the upper plenum chamber 46 and tubular fitting 48 of the friction member 10. The cooling fluid is further circulated through the conduit 49 into the tubular fitting 48 and upper plenum chamber 46 of the friction member 10a. Therefrom, the cooling fluid flows through the upper flow passages 39, the plurality of circulating chambers 30, and the lower flow passages 40, into the lower plenum chamber 42 and tubular fitting 44 of the friction member 10a. The cooling fluid is discharged from the friction member 10a back to the heat exchanger 2 for cooling purposes via the return conduit 7.

Although not shown, any conventional means can be employed to create an applying force for moving the friction members 10 and 10a of friction device 5 from retracted positions into frictional engagement with the friction drum 8 for deceleration and/or stopping purposes, as previously mentioned. When the outer surface of the arcuate wall 15 of the friction element 14 is moved into frictional engagement with the friction drum 8, a force is created on said arcuate wall in opposition to the applied force, and the intense heat generated during this frictional engagement is conducted through the relatively thin friction element 14, the ribs 28 and fins 29 thereof, and transferred to the cooling fluid continuously circulating through the circulating chambers 30.

The abutting engagement of the ribs 28 and base plate 22 serves to oppose the abovementioned force on the friction element 14 due to the frictional engagement in order to oppose permanent inward distortion or the collapse of said friction element. In addition, the supported spans 32 between the spaced grooves 31 in the friction element 14 serve to proportionally strengthen or stiffen the arcuate wall 15 to oppose the abovementioned force thereon.

When the heat generated during this frictional engagement becomes intense enough to cause the metal of the friction element 14 to expand beyond the particular elastic limits thereof, the individual spans 32 are permanently deformed; however, the grooves 31 and loci of weak points 33 absorb the individual deformation of said spans and oppose permanent distortion of the entire arcuate wall 15. In other words, the grooves 31 and loci of weak points 33 are predetermined to allow the metal of the friction element 14 to grow, or deform permanently, in such a manner that the aggregate outer surface of the arcuate wall 15 of the friction member 14 is maintained substantially symmetrical and smooth and even for frictional engagement with the friction drum 8 even though the individual spans 32 thereof are somewhat permanently deformed.

Upon completion of braking, the friction members 10 and 10a are returned to their original retracted positions, and the frictional engagement between the friction element 14 and friction drum 8 is terminated. The residual heat of the terminated frictional engagement serves to relieve any stresses created by the growth or permanent distortion of the metal and is ultimately transferred to the cooling fluid circulating through the system 1, as previously described.

From the foregoing, it is apparent that a fluid cooled friction member 10 is provided with a relatively thin metallic friction element 14 having means to absorb, yet permit permanent distortion due to intense frictional engagement. The abutting engagement between the ribs 28 and the base plate 22 of the friction element 14 serves to oppose the force on said friction element due to frictional engagement and thereby obviates permanent inward distortion, or the collapse of said friction element. The spans 32 intermediate the grooves 31 in the arcuate wall 15 serve to proportionately strengthen or stiffen said arcuate wall to oppose the force thereon.

It is also apparent that a fluid cooled friction member 10 is provided with a relatively thin, metallic, friction element 14 having means to absorb deformation thereof due to intense frictional engagement. When the generated heat of the frictional engagement expands the metal of the friction element 14 beyond its elastic limit to effect plasticity, the individual spans 32 permanently deform. The grooves 31 and loci of weak points 33 are purposely provided so that the spans 32 can deform or shift along these loci of weak points. In other words, the loci of weak points 33 are predeterminately positioned to allow the metal of the friction element 14 to grow, or deform permanently so that the aggregate outer surface of the arcuate wall 15 is maintained substantially symmetrical for effective frictional engagement with the friction drum 8 even though the individual spans 32 thereof are somewhat permanently deformed.

It is now apparent that there has been provided a friction device with a friction member having a reinforced, relatively thin, metallic friction element attached thereto for frictional engagement which fulfills all the objects and advantages sought therefor. It is to be understood, however, that the foregoing description and accompanying drawings have been presented only by way of illustration and example, and changes and alterations in the instant disclosure, which will be apparent to one skilled in the art, are contemplated as within the scope of the instant invention which is limited only by the claims that follow.

What I claim is:

1. A friction element for a fluid cooled friction device comprising a relatively thin metallic wall having a friction surface on one side adapted to engage another friction element, an integral supporting rib extending from the other side of said wall directly opposite said friction surface, and a groove in said wall dividing said friction surface into smaller spans and extending into said rib, the narrowest cross-section of said wall being between said groove and rib to provide a locus of weak points between said spans.

2. A fluid cooled friction member comprising a base member, a metallic friction element secured to said base member, a chamber for cooling fluid between said base member and metallic friction element, means to supply cooling fluid to said chamber and discharge cooling fluid therefrom, a plurality of supporting ribs in said chamber spacing said metallic friction element from said base member to oppose distortion of said metallic friction element inwardly of said chamber, and a plurality of grooves in the outer surface of said metallic friction element positioned relative to said ribs to substantially absorb permanent distortion of said metallic friction element in response to metal growth and obviate relative movement between said base member and metallic friction element.

3. A fluid cooled friction member comprising a metallic friction element having a friction wall with integral side walls extending therefrom forming an open-ended channel, a base member secured to said side walls to close said open-ended channel and form a chamber for cooling fluid therewith, admission and discharge means for cooling fluid in said chamber, a supporting rib between the inner surface of said metallic friction wall and said base member intermediate said side walls to oppose distortion of said metallic friction wall inwardly of said chamber, a groove positioned in the outer surface of said friction wall relative to said rib, and a locus of weak points between said groove and the inner surface of said friction wall to absorb permanent distortion of said friction wall in response to metal growth characteristics effected by cyclical thermal differentials and substantially obviate relative movement between said base member and said friction element.

4. A fluid cooled friction member comprising a metallic friction element having a friction wall with integral side walls extending therefrom forming an open-ended channel, a base member secured to said side walls to close said open-ended channel and form a chamber for cooling fluid therewith, spaced plenum chambers carried by said base member and in communication with said chamber, inlet and outlet means in said plenum chambers to supply cooling fluid to said chamber and discharge cooling fluid therefrom, an integral supporting rib on the inner surface of said friction wall and extending into abutment with said base wall to oppose distortion of said friction wall inwardly of said chamber, a groove in said friction wall positioned relative to said rib and dividing the outer surface of said friction wall into smaller spans, and a locus of weak points provided intermediate said spans to substantially absorb distortion thereof outwardly of said chamber.

5. A fluid cooled friction member comprising a metallic friction element having a friction wall with integral side walls extending therefrom forming an open-ended channel, a base member secured to said side walls to close said open-ended channel and form a circulating chamber for cooling fluid therewith, spaced plenum chambers carried by said base member, flow passages in said base member communicating said plenum chambers and said circulating chamber, inlet and outlet means in said plenum chambers to supply cooling fluid to said circulating chamber and discharge cooling fluid therefrom, a supporting rib integral with the inner surface of said friction wall in said circulating chamber and extending into abutment with said base member to oppose distortion of said friction wall inwardly of said circulating chamber, a groove in said friction wall dividing the outer surface thereof into smaller spans and extending into said supporting rib, and a locus of weak points intermediate said spans at the narrowest cross-section between said rib and groove to substantially absorb distortion of said spans outwardly of said circulating chamber.

6. A friction element for a fluid cooled friction device comprising a metallic wall having growth characteristics effected by cyclical thermal differentials, a friction surface on one side of said wall adapted to engage another friction element, an integral supporting rib on the other side of said wall directly opposite said friction surface, and a groove in said friction surface positioned relative to said supporting rib, the narrowest cross-section of said wall being between said groove and rib to provide a predetermined locus of weak points for absorbing permanent distortion of said wall in response to the metal growth characteristics thereof.

7. A friction element for use in a fluid cooled friction device comprising a metallic wall having permanent growth characteristics effected by cyclical thermal differentials, edge surfaces defining the extremities of said wall, a friction surface on said wall between said edge surfaces for heat generating frictional engagement, and groove means in said friction surface and extending in the rubbing direction of frictional engagement adjacent to, but spaced from one of said edge surfaces for absorbing permanent distortion of said wall in a direction normal to said one edge surface and said groove means in response to the metal growth characteristics and substantially obviating permanent distortion of said one edge surface.

8. A friction element for use in a fluid cooled friction device comprising a metallic wall having growth characteristics effected by cyclical thermal differentials, a friction surface on said wall, marginal edges on said wall defining the extremities of said wall, and spaced groove means formed in said friction surface adjacent to, but spaced from each of said marginal edges for absorbing permanent distortion of the portion of said wall intermediate said groove means in response to the metallic growth characteristics of said wall to substantially obviate distortion of the portion of said wall intermediate said groove means and said marginal edges.

9. A friction element for use in a fluid cooled friction device including a metallic wall having metal growth characteristics effected by cyclical thermal differentials of friction engagement, marginal edges defining the extremities of said wall, a friction surface between said edges for frictional engagement and having a predetermined symmetry, a cooling surface opposite said friction surface for heat exchange relation with cooling fluid, the combination comprising means for absorbing permanent distortion in said wall in a direction substantially normal to said friction surface and at least one of said marginal edges in response to said growth characteristics to substantially maintain the predetermined symmetry of said wall and obviate permanent distortion of said one edge, said means including groove means extending into said friction surface and being disposed in the rubbing direction of frictional engagement and spaced away from said one edge, and a locus of weak points in said wall between said groove means and cooling surface.

10. A friction member for use in a fluid cooled friction device comprising a chamber for cooling fluid, a metallic friction element forming one wall of said chamber and having spaced apart marginal edge surfaces secured to said member, sealing means between said edge surfaces and said member, said element having a friction surface portion between said edge surfaces and having permanent growth characteristics effected by cyclical thermal differentials, a cooling surface opposite said friction surface in heat exchange relation with cooling fluid in said chamber, grooves in said friction surface portion and being spaced from said edge surfaces and following the contour thereof, said grooves absorbing permanent distortion in said element and substantially obviating relative movement between said edge surfaces and member in response to metallic growth characteristics effected by cyclical thermal differentials between said friction and cooling surfaces.

11. A fluid cooled friction device comprising a pair of relatively rotatable members movable into frictional engagement, a chamber for cooling fluid in one of said members, a metallic friction element forming one wall of said chamber and having spaced apart edge surfaces defining the extremities thereof and extending in the direction of frictional engagement, a friction surface on said wall between said edge surfaces for frictional engagement with said other member, a cooling surface opposite said friction surface for heat exchange relation with the cooling fluid in said chamber, sealing means between said one member and element adjacent to said edge surfaces to prevent leakage of cooling fluid from said chamber, and means for absorbing permanent distortion of said element to substantially obviate relative movement between said element and member away from said sealing means in response to growth characteristics effected by cyclical thermal differentials upon frictional engagement of said members, said means for absorbing permanent distortion including groove means in said friction surface extending in said direction of frictional engagement and being spaced away from each of said edge surfaces, and a predetermined locus of weak points between said groove means and said cooling surface.

12. A fluid cooled friction device comprising a pair of relatively rotatable members movable into frictional engagement, a chamber for cooling fluid in one of said members, a metallic friction element forming one wall of said chamber and having spaced marginal edge surfaces extending in the direction of relative rotation of said members, said element having growth characteristics effected by cyclical thermal differentials, a friction surface on said element intermediate said edge surfaces for frictional engagement with the other of said members, a cooling surface opposite said friction surface for heat exchange relation with the cooling fluid in said chamber, sealing means between said element and one member adjacent to the marginal edge surfaces of said element to prevent leakage of cooling fluid from said chamber, a groove in said friction surface extending in the direction of relative rotation of said members and being adjacent to one of said edge surfaces to absorb permanent distortion of the friction surface portion of said element laterally of the direction of relative rotation between said members and thereby substantially obviate relative lateral movement between said one edge surface and said member in response to growth characteristics effected by cyclical thermal differentials between said friction and cooling surfaces upon frictional engagement of said friction surface and said other member, and said element having a locus of weak points between the base of said groove and said cooling surface to absorb permanent distortion of the friction surface portion of said element in a direction normal to the direction of relative rotation of said members and directly between said members and thereby substantially obviate relative movement between said one edge surface and member away from said sealing means in response to growth characteristics effected by cyclical thermal differentials between said friction and cooling surfaces upon frictional engagement of said friction surface and the other of said members.

References Cited in the file of this patent

UNITED STATES PATENTS

| | | |
|---|---|---|
| 1,131,810 | Zoller et al. | Mar. 16, 1915 |
| 1,536,558 | Bukowsky | May 5, 1925 |
| 2,537,174 | Townhill | Jan. 9, 1951 |
| 2,664,176 | Whalen | Dec. 29, 1953 |
| 2,747,702 | Van Zelm | May 29, 1956 |
| 2,821,271 | Sanford | Jan. 28, 1958 |
| 2,821,273 | Sanford | Jan. 28, 1958 |
| 2,880,823 | Sedergren | Apr. 7, 1959 |
| 2,934,178 | Eaton | Apr. 26, 1960 |
| 2,964,136 | Schnell | Dec. 13, 1960 |